United States Patent

Humbert et al.

[11] Patent Number: 5,970,750
[45] Date of Patent: Oct. 26, 1999

[54] METHOD OF MAKING A FIBER PREFORM INCLUDING A SURFACE TREATMENT TO CONSOLIDATE CONDENSED MATERIAL ON THE PREFORM

[75] Inventors: Patrick Humbert; Hélène Jameron, both of Paris; Pascal Mazabraud, Neuilly sur Marne; Pierre Rebreyend, Lille, all of France

[73] Assignee: Alcatel Fibres Optiques, Bezons Cedex, France

[21] Appl. No.: 08/600,872

[22] Filed: Feb. 13, 1996

[30] Foreign Application Priority Data

Feb. 14, 1995 [FR] France .................................. 95 01660

[51] Int. Cl.⁶ .................................................. C03B 29/02
[52] U.S. Cl. ................................ 65/391; 65/421; 65/433; 65/113; 65/112
[58] Field of Search .............................. 65/421, 433, 391, 65/113, 112

[56] References Cited

U.S. PATENT DOCUMENTS

| 4,689,212 | 8/1987 | Manfield .................................. 65/421 |
| 4,935,045 | 6/1990 | Yamauchi . |
| 4,975,102 | 12/1990 | Edahiro . |
| 5,000,771 | 3/1991 | Fleming .................................. 65/421 |
| 5,211,730 | 5/1993 | Kanamori .................................. 65/427 |
| 5,522,007 | 5/1996 | Drouart .................................. 65/391 |

FOREIGN PATENT DOCUMENTS

| 0216338A2 | 4/1987 | European Pat. Off. . |
| 0440130A1 | 8/1991 | European Pat. Off. . |
| 2589461A1 | 5/1987 | France . |
| 4-331733 | 11/1992 | Japan .................................. 65/433 |

*Primary Examiner*—John Hoffmann
*Attorney, Agent, or Firm*—Sughrue, Mion, Zinn, Macpeak & Seas, PLLC

[57] ABSTRACT

The invention relates to a method of performing surface treatment on a preform manufactured in an installation for manufacturing or building up preforms having supporting cores, the installation including at least rotation means having a horizontal axis of rotation and two mounting points between which the supporting core of the preform to be manufactured or built up is mounted, plasma-torch and material-supply means disposed radially relative to the supporting core and mounted to move in axial translation relative to and parallel to the supporting core so as to make the preform around the supporting core, the preform being manufactured or built up by effecting successive passes with the plasma torch while material is being supplied. According to the invention, after the plasma torch passes with material being supplied have been effected, and/or after the preform has been separated, at least one pass is effected automatically and without cooling the preform, which pass is effected with a plasma torch and without material being supplied so as sinter deposits comprising condensation soot.

7 Claims, 2 Drawing Sheets

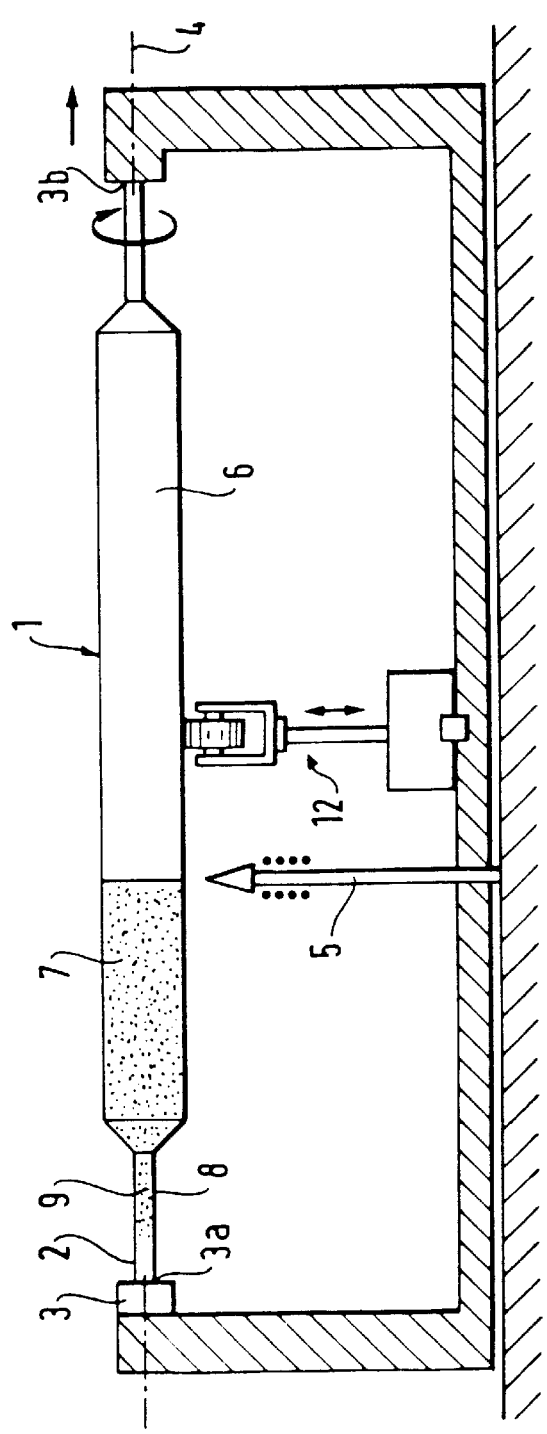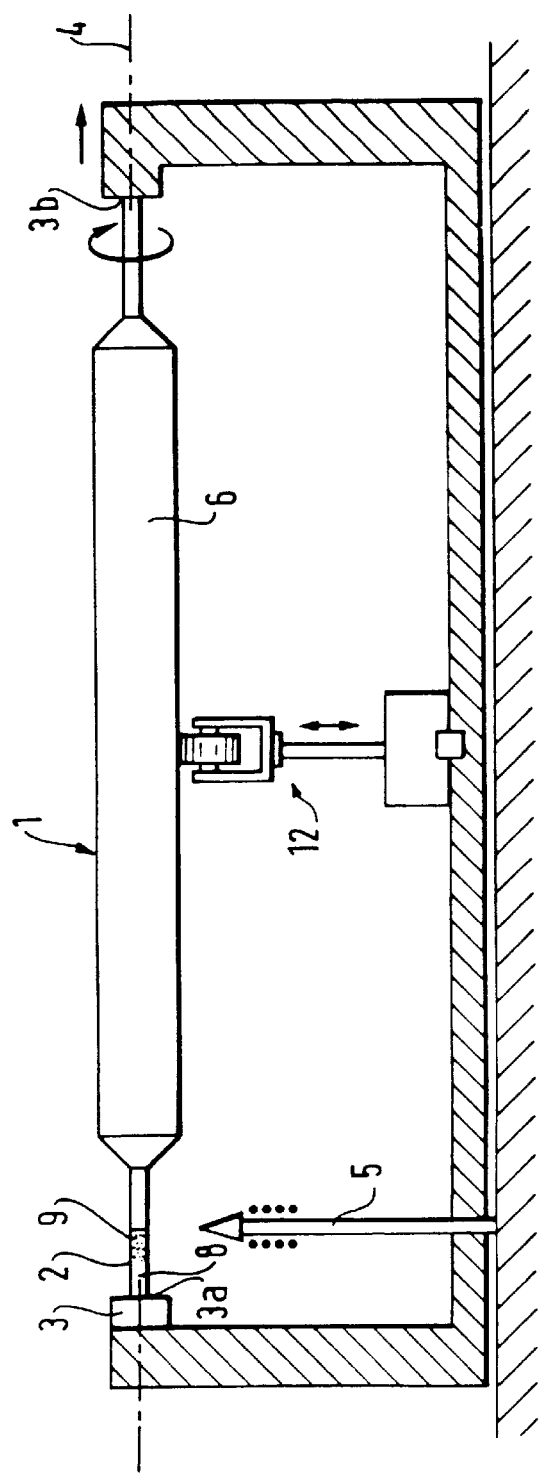

METHOD OF MAKING A FIBER PREFORM INCLUDING A SURFACE TREATMENT TO CONSOLIDATE CONDENSED MATERIAL ON THE PREFORM

The invention relates to a method of performing surface treatment on an optical fiber preform, a method of making an optical fiber preform involving such a surface treatment method, and a preform made by implementing such methods.

BACKGROUND OF THE INVENTION

The invention relates more particularly to a method of performing surface treatment on an optical fiber preform manufactured in an installation for manufacturing or building up preforms having supporting cores. Such an installation includes rotation means having a horizontal axis of rotation and two mounting points between which the supporting core of the preform to be manufactured or built up is mounted, plasma-torch and material-supply means disposed radially relative to said supporting core and mounted to move in axial translation relative to and parallel to the supporting core so as to make said preform around said supporting core. The preform is manufactured or built up by effecting successive passes with the plasma torch while material is being supplied.

During the above step, a portion of the feed material that has not attached to the preform generates soot. In known manner, such installations are equipped with suction hoods which suck up the soot so as to prevent it from being deposited on the preform.

The manufacturing or building-up step is followed by a separation step in which the preform is cut transversely at one of its ends so that it can be removed from the installation.

During the separation step, the temperature of the separation zone of the preform is raised by means of the plasma torch or by means of a blow torch so as to make the separation zone ductile, and then the ductile separation zone is drawn until the preform is actually separated from its end-piece.

Apart from the soot generated by the material that has not attached to the preform, during the manufacturing or building-up step and during the separation step, the peripheral surface of the preform is heated by the plasma torch to a temperature such that the material making up the preform evaporates and condenses in the vicinity of said surface. The material evaporates, and then cools as it rises and condenses, thereby forming soot that falls back onto the preform.

Thus, during the last pass of the manufacturing or building-up step, soot is generated which, once deposited on the preform, significantly reduces the quality of the surface state of the preform. This results in an increase in roughness, and affects the transparency of the preform.

Likewise, during the separation step, heating the separation zone gives rise to soot deposition in the vicinity of the separation zone.

In order to remedy these drawbacks, an additional step is performed, whereby the preform is vitrified by means of a blow torch. This additional step significantly lengthens the preform manufacturing time because, in order to perform the additional step, the preform must have cooled sufficiently for it to be possible for an operator to vitrify the surface with a blow torch. Any reduction in cooling time considerably increases the risks of accident for the operator. However, locally re-heating a cooled preform during the surface vitrification step can have major consequences on the preform in the re-heated zone. In particular, cracks can occur. Therefore, a compromise must be struck between quality and safety because of the human presence during the vitrification stage.

OBJECTS AND SUMMARY OF THE INVENTION

An object of the present invention is therefore to provide a method that eliminates the need for human presence during the surface treatment of the preform, thereby making it possible to omit the cooling stage, and thus to reduce preform manufacturing time considerably.

To this end, the invention provides a method of performing surface treatment on a preform manufactured in an installation for manufacturing or building up preforms having supporting cores, said installation including at least rotation means having a horizontal axis of rotation and two mounting points between which the supporting core of the preform to be manufactured or built up is mounted, plasma-torch and material-supply means disposed radially relative to said supporting core and mounted to move in axial translation relative to and parallel to the supporting core so as to make said preform around said supporting core, said preform being manufactured or built up by effecting successive passes with the plasma torch while material is being supplied. According to the invention, after the plasma torch passes with material being supplied have been effected, and/or after the preform has been separated, at least one pass is effected automatically and without cooling the preform, which pass is effected with a plasma torch and without material being supplied so as vitrify deposits comprising condensation soot.

According to a characteristic of the method, the same plasma torch is used both for the passes effected with material being supplied, and also for the passes effected without material being supplied.

Advantageously, at least one pass effected with the plasma torch and without material being supplied sweeps over the deposits on those portions of the supporting core which are not subjected to passes effected with the plasma torch while material is being supplied.

The plasma torch is set so that the temperature of the surface of the preform being treated is lower than the evaporation temperature of the material making up the preform, and is higher than the vitrification temperature of the material making up the preform.

The invention also provides a method of manufacturing or building up an optical fiber preform, said method including a preform surface treatment method as described above.

Advantageously, the method of manufacturing or building up an optical fiber preform includes:

an automatic preform manufacturing or building-up step; then an automatic preform separating step without intermediate cooling; and a surface treatment step according to the above-described surface treatment method.

The method of manufacturing or building up an optical fiber preform may further include an intermediate surface treatment step according to the above-described surface treatment method, between the automatic preform manufacturing or building-up step and the automatic preform separating step without intermediate cooling.

The invention further provides an optical fiber preform manufactured or built up according to the above-described method of manufacturing or building up a preform.

A first advantage of the present invention is that it eliminates the manual surface treatment operations.

Furthermore, such a method is particularly advantageous when used in an installation of the type described in French Patent Application FR 94 13 378. In that installation, the manual operations of separating the preform are automated by means of apparatus for automatically supporting the preform. As a result, by associating the surface treatment method of the invention with an installation of that type, it is possible for manufacturing or building-up, separating, and surface treatment of a preform to be fully automated without any intermediate manual operations being necessary, and therefore without any intermediate cooling of the preform. The manufacturing time and the quality of the resulting preform are therefore significantly improved.

BRIEF DESCRIPTION OF THE DRAWINGS

Other advantages and characteristics of the present invention appear from the following description given with reference to the accompanying drawings, in which:

FIGS. 1 to 3 are diagrams showing a preform undergoing surface treatment according to the method of the invention.

MORE DETAILED DESCRIPTION

Figure 3:
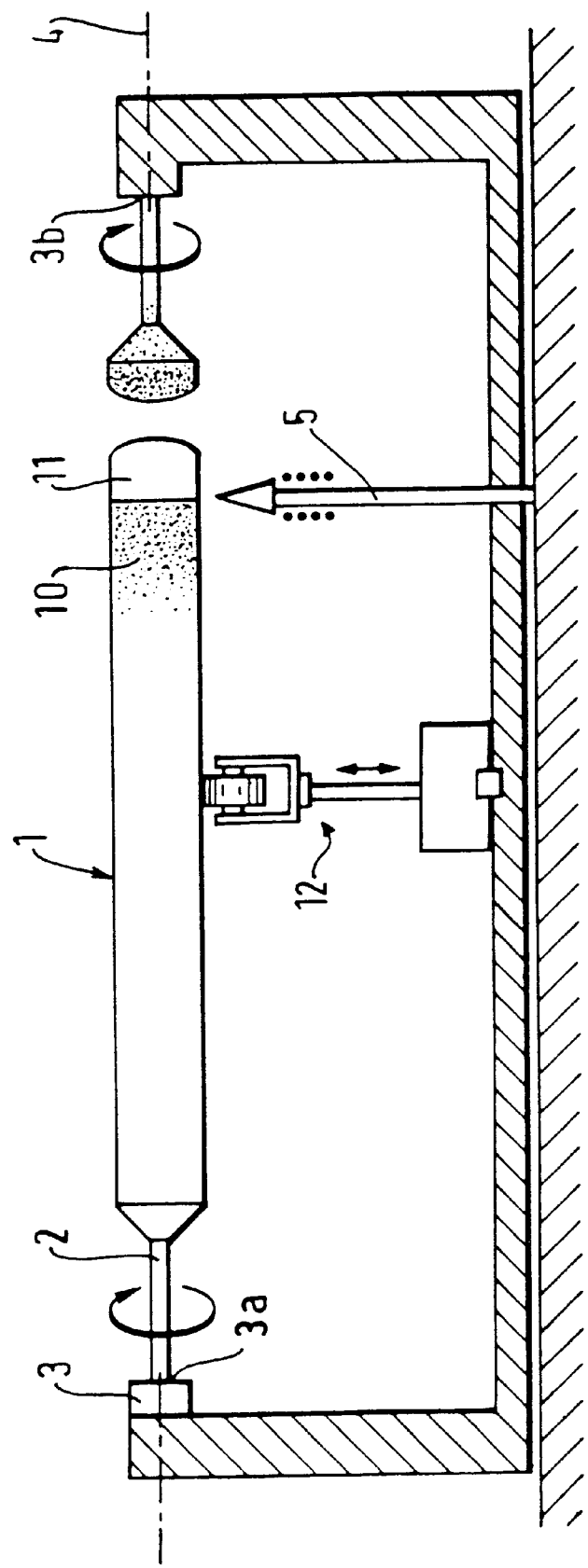

The method of the invention is intended to be implemented in a prior art installation for manufacturing or building up a preform 1 having a central supporting core 2. In known manner, such an installation includes at least rotation means 3 having a horizontal axis of rotation 4 and receiving the supporting core 2 of the preform 1 to be manufactured or to be built-up, and plasma-torch and material-supply means 5 disposed radially relative to said supporting core 2. In known manner, the installation makes it possible for the plasma-torch and material-supply means 5 to move in axial translation relative to and parallel to the supporting core 2 so as to make the preform 1 around the supporting core 2.

In the implementation shown in the figures, the rotation means 3 are disposed on a frame that is mounted to move in translation parallel to the axis of rotation 4, with the plasma-torch and material-supply means being fixed.

The preform being manufactured or built up is thus moved in translation with the frame to which it is attached at two abutment points constituted by the mounting points 3a, 3b at which the supporting core 2 is mounted on the rotation means 3.

The preform is thus manufactured by causing the preform to effect a plurality of passes facing the plasma-torch and material-supply means.

Advantageously, but not limitatively, the installation may include controlled support means 12 disposed between the two mounting points 3a, 3b, and constituting additional abutment points for the preform 1. Thus, by appropriately choosing the position of the controlled support means, it is possible to reduce the sag due to the mass of the preform being manufactured or built up.

The controlled support means and operation thereof are described in the Applicant's French Patent Application No. 94 13 378.

As shown in FIGS. 1 and 2, after the preform manufacturing or building-up passes, soot deposits 7, 9 due to evaporation and condensation remain on the preform 1 itself and on those portions 8 of the supporting core that have not been subjected to the manufacturing or building-up passes.

The surface treatment method of the invention includes a step performed after the manufacturing passes, in which step at least one pass is effected automatically and without cooling the preform, which pass is effected with a plasma torch and without material being supplied. In this way, a preform is obtained having a surface state 6 that is free from any significant roughness as a result of the soot deposits 7, 9 being vitrified.

Advantageously, at least one pass is effected with a plasma torch and without material being supplied on those portions 8 of the core 2 of the preform 1 which have not been subjected to the manufacturing or building-up passes.

Advantageously, the same plasma torch is used both for the manufacturing and building-up passes and for the passes effected without material being supplied.

Similarly to after the manufacturing or building-up step, and for the same reasons, after the separation step, a soot deposit 10 remains at least in the vicinity of the end 11 of the preform (FIG. 3). In the surface treatment method of the invention, after separation has been performed, at least one pass is effected with a plasma torch and without material being supplied so as to vitrify the resulting deposit 10.

With an installation including support elements that make it possible to go automatically and without cooling from the preform manufacturing or building-up step to the separation step, it is thus possible to perform all of the manufacturing or building-up, separation, and surface treatment operations automatically, without cooling, and in a single stage. The resulting method is as follows:

an automatic preform manufacturing or building-up step; then
   an automatic preform separating step without intermediate cooling; and
   a surface treatment step according to the above-described surface treatment method.

Advantageously, a surface treatment step may be interposed between the automatic preform manufacturing or building-up step and the automatic preform separating step without intermediate cooling.

During the surface treatment passes, the plasma torch is set so as to heat the surface of the preform to a vitrification temperature that is lower than the evaporation temperature of the material making up the preform.

An advantage of the present invention is that it makes it possible to make preforms having good surface states, of roughness of about 10 nm.

Another advantage of the present invention is that it makes it possible for the surface treatment to be automated as well as the separation. This leads to automation of the method, and thus to productivity gains, to elimination of risks for the operator, and to elimination of risks of defects in the quality of the preform due to re-heating the preform, which is necessary in the prior art.

Although only one implementation is described, any obvious modification made to the invention by a person skilled in the art lies within the ambit of said invention.

We claim:

1. A method of performing surface treatment on a preform manufactured in an installation for manufacturing or building up preforms having supporting cores, said installation including at least rotation on means having a horizontal axis of rotation and two mounting points between which a supporting core of a preform to be manufactured or built up is mounted, at least one plasma-torch having material-supply means and disposed radially relative to said supporting core and mounted to move in axial translation relative to and parallel to the supporting core in a surface treatment pass while supplying material to said supporting core so as to make said perform around said supporting core, said preform being manufactured by effecting successive material supplying passes with said at least one plasma torch while said material is being supplied for formation of the preform, said surface treatment method comprising the step of:

after the material supplying passes have been effected, automatically performing at least one surface treatment pass over a surface of the preform by said at least one plasma torch without performing performing any step to cool the preform between said material supplying passes and said at least one surface treatment pass, wherein said at least one surface treatment pass comprises a pass performed without supplying said material, so as to consolidate and glaze condensation soot deposits.

2. A method according to claim 1, wherein said at least one plasma torch is used for the material supplying passes and also for the surface treatment pass.

3. A method according to claim 1, wherein said supporting core includes portions which are not subjected to said material supplying passes and wherein during said at least one surface treatment pass said torch sweeps over said condensation soot deposits on said portions of the supporting core.

4. A method according to claim 1, wherein, during said surface treatment pass, a temperature of said surface opposite said at least one plasma torch is lower than a temperature of said surface of the preform opposite said at least one plasma torch during said material supplying passes, and said temperature of said surface opposite said at least one plasma torch during said surface treatment pass is higher than a temperature at which said material forming said preform consolidates.

5. A method of manufacturing an optical fiber preform in an installation for manufacturing or building up performs having supporting cores, said installation including at least rotation means having a horizontal axis of rotation and two mounting points between which a supporting core of a perform to be manufactured or built up is mounted, at least one plasma-torch with material-supply means, disposed radially relative to said supporting core and mounted to move in axial translation relative and parallel to the supporting core so as to make said preform around said supporting core, said method comprising the steps of:

effecting successive material supplying passes with said plasma torch and material supply means while supplying material to said core for formation of the preform, and automatically performing at least one surface treatment pass over a surface of the perform by said at least one plasma torch, wherein the surface treatment is performed without supplying said material, so as to consolidate and glaze condensation soot deposits.

6. A method according to claim 5, further including the step of automatically separating said preform from a portion of said rotation means before said surface treatment step.

7. A method of manufacturing an optical fiber preform in an installation for manufacturing or building up preforms having supporting cores, said installation including at least rotation means having a horizontal axis of rotation and two mounting points between which a supporting core of a preform to be manufactured or built up is mounted, at least one plasma-torch with material-supply means, disposed radially relative to said supporting core and mounted to move in axial translation relative to and parallel to the supporting core so as to make said preform around said supporting core, said method comprising the steps of:

effecting successive material supplying passes with said plasma torches while supplying material to said core for formation of the preform, automatically performing at least one first surface treatment pass over a surface of the preform by said at least one plasma torches, wherein said first surface treatment pass is preformed without supplying material so as to consolidate and glaze condensation soot deposits, and automatically separating said preform.

\* \* \* \* \*